United States Patent [19]

Chau et al.

[11] Patent Number: 4,957,817

[45] Date of Patent: Sep. 18, 1990

[54] FILM, FIBER, AND MICROPOROUS MEMBRANES OF POLY(ETHERETHERKETONE)DISSOLVED IN HIGH BOILING POINT POLAR ORGANIC SOLVENTS

[75] Inventors: Chieh-Chun Chau, Midland, Mich.; Ritchie A. Wessling, Berkeley, Calif.

[73] Assignee: The Dow Chemical, Midland, Mich.

[21] Appl. No.: 276,006

[22] Filed: Nov. 25, 1988

[51] Int. Cl.$^5$ .............................................. C08J 9/28
[52] U.S. Cl. .................................... 428/436; 521/64; 521/79; 521/180; 528/125; 528/128; 264/45.9; 264/46.1; 264/209.1; 264/209.2
[58] Field of Search ................ 528/128, 125; 521/64, 521/79, 180; 524/359, 467, 170, 352, 340, 367, 292, 296, 295, 341; 428/436; 264/209.1, 209.2, 45.9, 46.1; 210/500.21, 500.23, 500.27, 500.33

[56] References Cited

U.S. PATENT DOCUMENTS

| | | |
|---|---|---|
| 3,928,295 | 12/1975 | Rose .................................... 428/426 |
| 4,110,314 | 8/1978 | Yagi et al. ............................ 528/126 |
| 4,182,582 | 1/1980 | Youval et al. ....................... 264/45.9 |
| 4,257,126 | 7/1988 | Fukawa et al. ..................... 528/125 |
| 4,320,224 | 3/1982 | Rose et al. .......................... 528/126 |
| 4,419,486 | 12/1983 | Rose .................................... 525/535 |
| 4,539,256 | 9/1985 | Shipman ............................ 528/315.5 |
| 4,636,557 | 1/1987 | Deckers .............................. 528/126 |
| 4,714,725 | 12/1987 | Hendy et al. ....................... 524/108 |
| 4,721,732 | 1/1988 | Dubrow et al. ...................... 521/62 |

FOREIGN PATENT DOCUMENTS

| | | |
|---|---|---|
| 202082 | 6/1985 | European Pat. Off. . |
| 225750 | 12/1985 | European Pat. Off. . |
| 254431 | 1/1988 | European Pat. Off. . |
| 3402471 | 8/1985 | Fed. Rep. of Germany . |
| 57-191322 | 5/1981 | Japan . |
| 58-063417 | 10/1981 | Japan . |
| 62-095104 | 1/1987 | Japan . |
| 62-95104 | 5/1987 | Japan . |
| 2180790 | 4/1987 | United Kingdom . |

OTHER PUBLICATIONS

Andrew J. Lovinger and D. D. Davis: Macromolecules (1986) 19 1861–1867.
M. T. Bishop et al., "Solubility and Properties of a Poly(aryletherketone) in Strong Acids"; *Macromolecules*, 1985, ACS, vol. 18, pp. 86–93.
X. Jin et al., "A Sulphonated Poly(aryletherketone)"; *British Polymer Journal*, vol. 17, No. 4(1985).
T. E. Attwood, et al., "Synthesis and Properties of Polyaryletherketones"; *Polymer Preprints, vol. 20, No. 1, pp. 191–194(Apr., 1979)*.
Dr. Klaus Dahl (Raychem Corporation), "Heat Resistant Semicrystalline Poly(phenylene ether ketones). Melt Processable High Performance Polymers", The 36th Industrial Affiliates Symposium on High Performance Polymers, Department of Chemistry and Chemical Engineering, Stanford University, Dec. 3–5, 1986.
C. Kamizawa et al., "Preparation of Two Types of Ultrafiltration Membranes Using Organic Solvents as the Gelating Solutions," Proceedings of the International Congress on Membranes and Membrane Processes at Tokyo, Japan(1987).
Klaus Dahl, "Heat . . . Poly(Phenylene Ether) Ketones Melt Processable High Performance Polymers"–36th Industrial Affiliates Symposium on High Chemical Engineering, Stanford University, Dec. 3–5, 1986.
C. Kamizawa, M. Matsuda and R. Kobayashi–"Preparation . . . Solutions", Proceedings of the Intl. Congress on Membranes and Membrane Processes at Tokyo, Japan (1987)..

Primary Examiner—Veronica P. Hoke
Attorney, Agent, or Firm—Thomas A. Ladd

[57] ABSTRACT

High boiling point polar organic solvent are useful solvents for poly(etheretherketone)-type polymers (PEEK). Solutions of PEEK may be used to form PEEK articles such as film, microporous sheet membrane, fiber and microporous hollow fibers. The microporous PEEK is useful as an ultrafiltration membrane and as a substrate for the formation of reverse osmosis membranes. A method of making PEEK articles including microporous sheet membranes is disclosed. A method of making PEEK fibers including microporous hollow membrane fibers is disclosed.

19 Claims, 5 Drawing Sheets

FILM, FIBER, AND MICROPOROUS MEMBRANES OF POLY(ETHERETHERKETONE)DISSOLVED IN HIGH BOILING POINT POLAR ORGANIC SOLVENTS

BACKGROUND OF THE INVENTION

Microporous polymer membranes are staple products in the art of separations technology.

Poly(oxy-1,4-phenyleneoxy-1,4-phenylene-carbonyl-1,4-phenylene), more commonly known as poly(etheretherketone), or PEEK, displays advantageous chemical and physical properties for many uses. The high melting point, about 367° C., high glass transition temperature, about 145° C., low solubility and high chemical resistance make PEEK a material of choice for separations applications for harsh environments.

PEEK is not known to be affected by common organic solvents at room temperature. PEEK is also resistant to acids and bases, with the exception of strong acids in high concentrations.

Films of asymmetric polymer membranes useful for ultrafiltration and reverse osmosis membrane supports are traditionally formed by dissolving the polymer in a solvent, casting the solubilized polymer on a support as a thin film, followed by coagulation of the polymer by immersion of the support and polymer film into a bath of liquid in which the polymer solvent is miscible, but which is not a solvent for the polymer. The general insolubility of PEEK, while a useful and advantageous property of a membrane in place, complicates the formation of membranes from PEEK. Microporous PEEK membranes have not heretofore been reported.

PEEK solubility has been reported in concentrated sulfuric acid (German Pat. No. 3,321,860) and U.S. Pat. No. to Rose et al., 4,320,224, column 9, line 5. Membranes have been cast from PEEK dissolved in concentrated $H_2SO_4$. However, the membranes formed are no longer PEEK, but rather have been sulfonated. As a consequence of the change of chemical composition, the membranes no longer display the advantageous properties of PEEK and are known to swell upon prolonged exposure to water. Jin, X. et al. *Br. Polym. J.*, 17, 4 (1985). Bishop, M. T. et al., *Macromolecules*, 1985, 18, 86.

An objective of this invention is to provide for the preparation of a microporous semi-permeable membrane film and hollow microporous semi-permeable membrane fibers composed of PEEK, and a method of making such membranes. A further objective of this invention is to provide for the preparation of ultrafiltration and microfiltration semi-permeable membranes composed of PEEK, the preparation of membrane substrates from PEEK for reverse osmosis membranes, and the preparation of PEEK membranes having substantially improved transport flux without sacrifice of selectivity.

SUMMARY OF THE INVENTION

A semi-permeable membrane suitable as an asymmetrical ultrafiltration (UF) membrane and as a support for a reverse osmosis (RO) membrane can now be prepared from PEEK. It has now been found that PEEK may be dissolved by certain high melting point polar organic solvents. Microporous membranes in sheet form may be prepared according to the method of the invention by casting films of PEEK. Microporous membranes in hollow fiber form may be prepared according to the method of the invention by extruding PEEK dissolved in certain high melting point polar organic solvents.

DETAILED DESCRIPTION OF THE INVENTION

Microporous PEEK membranes of the present invention are conveniently formed from a solid particulate form of PEEK polymer, such as, e.g., a powder, pellets, or other convenient or available PEEK subdivided form. Peek-type polymer may be obtained from a commercial source such as that sold under the Registered Trademark VICTREX by ICI Americas, Inc., Wilmington, Del. Or, PEEK may be prepared by a condensation polymerization reaction involving as the starting material 4,4'difluorobenzophenone and hydroquinone, to which is added anhydrous potassium carbonate in a nitrogen atmosphere at temperatures up to 320° C. Detailed instructions appear in U.S. Pat. No. 4,320,224 to Rose et al., which are incorporated herein by reference.

PEEK-type polymer used for the examples of the instant invention was secured from ICI Americas, Inc. The molecular weight provided by the manufacturer for grade 150G was 7,000, for grade 380G was 13,000, and for grade 450P was 18,000. A weight-average molecular weight determination from measurements of intrinsic viscosities of samples dissolved in sulfuric acid using a Mark-Houwink relation (K=0.000745, a=0.65) established from the data in Bishop, M. T.: Russo, P. S.: Langley, K. H., *Macromolecules*, 18, 86, 2786 (1985), and including a correction to account for the changes in molecular weights resulting from sulfonation of the PEEK samples in sulfuric acid. A weight-average molecular weight for a sample of: grade 150G PEEK is 20,700, for grade 380G is 32,200 and for grade 450P is 39,200. Reference herein to molecular weight relates to the weight-average molecular weights.

Film, fiber, microporous membranes in sheet form, or hollow fiber form are prepared from solid PEEK dissolved in an appropriate high-temperature solvent. The method described herein permits the preparation of useful articles of PEEK at temperatures significantly below the melting temperature.

Solvents useful for making a solution of dissolved PEEK are organic compounds with some degree of polarity having a boiling point from 175° to 380° C. A large percentage of such organic compounds will have an aromatic or polynuclear aromatic component. Advantageously used are solvents having a boiling point above about 240° C. to about 300° C. Solvents found useful in the application of this invention and their boiling points include benzophenone, 305° C.; α-chloronaphthalene, 259° C.; diphenylsulfone, 379° C.; 2-phenylphenol, 282° C.; p-methoxyphenol, 243° C.; 2-methoxynaphthalene, 274° C.; ethyl-4-hydroxybenzoate, 297° C.; N-cyclohexyl-2-pyrrolidone, 305° C.; pentafluorophenol, 143° C.; dimethylphthalate, 284° C.; and phenyl benzoate, 298° C. As will readily be apparent to persons skilled in the art, other suitable solvents are readily selected in accordance with this invention. No unnecessary limitations are to be understood from the foregoing list of suitable solvents. The invention is not limited to the solvents enumerated and described. Other solvent choices will become apparent to those skilled in the art upon becoming familiar with the present specification and examples.

A solution of PEEK and an appropriate high boiling point solvent is prepared by warming a mixture of solvent and solid particulate PEEK while stirring the mixture. The solvent and solid particulate or subdivided PEEK are warmed together to an elevated temperature in the range of 175° to 390° C., whereupon, with stirring, the PEEK is dissolved in the solvent. Mixing times necessary to completely dissolve PEEK solids vary with the high boiling point polar organic solvent chosen, the size of the solid PEEK particles, and the temperature of the mixture. As a solid particulate PEEK decreases in size from chunks to powder, mixing times necessary to complete dissolution decrease. Minimum effective mixing temperatures for the high boiling point polar organic solvents are temperatures at which such solvents are liquid. The weight ratio of high temperature solvent to PEEK, on a weight-to-weight basis, may vary from 95:5 to 5:95. Ratios of high boiling point polar organic solvent to PEEK from 50:50 to 90:10 are preferred, with ratios from 60:40 to 85:15 being most preferred. Mixing times observed over the variable ranges specified vary from 5 minutes to 120 minutes under conditions of moderate agitation.

It is known to prepare microporous polymer membranes by a phase inversion method. Phase inversion refers to a process of membrane formation whereby polymer solutions become set in a semi-solid gel phase before the solvent is completely removed from the microporous membrane. The process of forming polymer membranes by phase inversion requires that the polymer selected for the membrane be dissolved in a suitable solvent at room temperature. In conventional phase inversion, the polymer precipitates from a solution mixture when the polymer solution mixture comes into contact with a coagulation fluid which is miscible with the polymer solvent. The porosity of microporous membranes formed by conventional phase inversion results from precipitation of the polymer from solution upon contact of the polymer solution with the coagulation fluid.

The phase inversion method is generally applied to amorphous polymers. The phase inversion method has heretofore not been applied to crystalline polymers such as PEEK. Surprisingly, microporous membranes may nonetheless be prepared from solutions of PEEK in the manner described herein.

Flat sheets of unsupported PEEK membrane may be prepared by casting at room temperature a solution of dissolved PEEK on a smooth surface, such as a glass plate, then stripping the coagulated membrane from the glass after it has coagulated. Advantageously, a supported PEEK membrane may be prepared by incorporating a reinforcing medium to provide rigidity and strength into the film or membrane cast. A reinforcing medium may be a non-woven glass fabric or a non-woven polyester fabric, but could also be a ceramic. The reinforcing material may be incorporated into the film or membrane by casting a solution of dissolved PEEK on the reinforcement which has itself been placed on the smooth surface prior to casting a solution of dissolved PEEK. A suitable reinforcing for a PEEK membrane prepared according to this invention will not melt or materially change its properties as a reinforcement as a result of exposure to the elevated temperature of the PEEK solution during the coagulation interval.

In the casting of film membranes from a solution of PEEK in a high boiling point polar organic solvent, an advantageous asymmetric membrane structure results from the casting of dissolved PEEK on a smooth supporting surface, such as glass, to form an unsupported membrane or upon a fibrous support in the preparation of a supported PEEK membrane. The asymmetry is believed to result from a more rapid solvent evaporation at the interface of the PEEK solution and air than occurs at the interface of the PEEK solution and the membrane casting surface, viz., glass. The polymer density is observed to increase at the surface of the membrane at the air-polymer solution interface. The asymmetric character of the membrane advantageously gives a permselective layer at the membrane skin. To a large extent the permselective skin layer determines the pore size, filtration and selectivity characteristics of the membrane. Modifications of the conditions under which the solvent evaporates from the membrane are convenient parameters to modify the skin formation, and therefore the filtration properties, semi-permeability, and operating characteristics of the microporous membranes formed.

The morphology of the resulting microporous membrane appears related to the cooling rate of the PEEK solution. At higher cooling rates obtained by blowing air over a membrane film of freshly cast PEEK solution, the membranes demonstrate a lower rate of transmission of water than a membrane slowly cooled in room temperature air. The measured maximum pore size of samples slowly cooled in air is nearly twice as large as more rapidly cooled samples. The air-quenched sample membrane has a pore size retention of 0.091 $\mu$m. A membrane formed by slow cooling in air has a pore retention size of 0.173 $\mu$m. This phenomenon is thought to be a result of the separation of liquid phases of the PEEK solution in the manner of a spinodal decomposition whereby precipitating solvent droplets separate from the PEEK causing the formation of vacuoles containing solvent in a matrix of polymer. The morphology of the membrane formed is thus related to the rate of cooling of the nascent membrane.

The polymer solvent may be removed by evaporation if the vapor pressure of the solvent is high enough in the case of a volatile solvent, or polymer solvent removal may be aided by extraction with another, preferably more volatile, liquid in which the polymer solvent is miscible.

An optional method of modifying the skin formation, giving an asymmetric character to the membrane formed and thereby modifying and controlling the filtration properties, semi-permeability and operating characteristics of the membrane formed, is to contact the nascent membrane with a coagulation fluid.

A suitable coagulation fluid is not a solvent for PEEK. Immersion or spraying of the coagulation fluid may be a convenient method of contacting the nascent membrane with the coagulation fluid.

A coagulation fluid which has a low affinity for the high boiling point PEEK solvent can cause coagulation by removing heat from the nascent membrane. A coagulation fluid demonstrating a low affinity or immiscibility would be effective when the coagulation fluid temperature is less than the temperature of the nascent membrane.

Contact of the nascent membrane with coagulation fluid which has a low affinity for, or is immiscible with, the high boiling point PEEK solvent results in the formation of a skin on the membrane surface in contact with the coagulation fluid. The nascent coagulated membrane has sufficient structural integrity to allow handling until completion of the solvent removal step. Contact of nascent PEEK membranes with a coagulation fluid which has a high affinity for the high boiling point polar organic solvent results in the formation of a large number of fine pores in the membrane skin, significantly enhancing membrane filtration properties.

The high boiling point polar organic solvent for PEEK may be removed from the coagulated membrane by a suitable organic solvent for the high boiling point polar organic solvent. As PEEK is known to be insoluble in common organic solvents, the high boiling point polar organic solvent for PEEK can be leached from the coagulated membrane by a common organic solvent with which the high boiling point polar organic solvent is miscible without affecting the properties of the PEEK membranes. Common organic solvents effective to remove the high boiling point polar organic solvent for PEEK include $C_{1-5}$ alcohols, $C_{3-8}$ ketones, $C_{2-6}$ sulfones, $C_{2-5}$ halogenated alkene, and $C_{1-5}$ halogenated alkanes. The solvent leaching step may be accomplished by a single contact extraction of a sufficiently large volume of common organic solvent or by a sequence of several solvent extractions. Adequate membrane immersion times may vary from 5 minutes to 120 minutes.

The high boiling point polar organic solvents disclosed herein also make possible the manufacture of solid and hollow fibers of PEEK by extrusion of a solution of PEEK dissolved in a high boiling point polar organic solvent. Fibers are most conveniently extruded into a coagulation bath to rapidly provide handling strength to the nascent fiber which is not required of sheet film or sheet membranes cast on a smooth surface. From hollow fibers of PEEK there may be formed asymmetric microporous hollow fiber membranes of PEEK.

Hollow fiber membranes of PEEK are prepared by extruding a solution of PEEK in a high boiling point polar organic solvent through a die having an annular orifice. Through an additional hole in the orifice, a fluid is injected into the bore of the nascent hollow fiber to prevent collapse of the fiber lumen. The injection fluid may be a gas or a liquid. In about the same manner as for film membranes, the membrane operating characteristics, the degree of asymmetry, skin pore size, and physical properties of the hollow fiber membranes may be influenced by the choice of high boiling point solvent, rate of membrane cooling, choice of coagulation fluid, rate of solvent extraction, and a choice of organic solvent for extraction of high boiling point polar organic solvent. The asymmetric characteristics of a hollow fiber membrane may be reversed by exchanging the bore fluid for the coagulation bath.

As in conventional phase inversion, PEEK coagulation may be affected by contacting the extruded molten PEEK fiber with a fluid which is a non-solvent for PEEK, but which has an affinity for the high boiling point polar organic solvent for PEEK. The porosity, and hence the membrane properties of the resulting PEEK microporous membrane, may be influenced by the relative affinity of the coagulation fluid for the high boiling point polar organic solvent. A coagulation fluid which has a high affinity for the high boiling point polar organic solvent is a fluid which is nearly completely miscible with the high boiling point organic solvent at room temperature and which has a low viscosity. This combination of features permits the high boiling point organic solvent for PEEK to rapidly migrate toward an equilibrium condition with the coagulation fluid. Suitable coagulation liquids having a low affinity for the PEEK solvent include tetraethylene glycol, polyethylene glycols, triethylene glycol, glycerines, polypropylene glycol and other polyglycols. Coagulation liquids having a high affinity for the PEEK solvent include methyl alcohol, ethyl alcohol, n-propyl alcohol, i-propyl alcohol, dimethyl ketone, methylethyl ketone, N-methylpyrrolidinone (NMP), N-cyclohexyl-2-pyrrolidone, dimethyl formamide, dimethylsulfoxide, and dimethylacetamide.

A nascent PEEK membrane contacted by a coagulation fluid having a high affinity for the high boiling point organic solvent for PEEK will have more porous structures formed on the membrane surface than results from contact of the nascent PEEK membrane with a coagulation fluid having a low affinity for the high temperature organic solvent for PEEK. For low affinity coagulation fluids, the porosity of the resulting PEEK membrane is believed to be primarily influenced by the rate of phase separation of the PEEK membrane solution and the thermomechanical effects such as internal stress induced by cooling the PEEK fiber in a fluid.

At the temperatures at which PEEK film, fiber and membranes are prepared according the method of this invention, the vapor pressure of the high boiling point polar organic solvent at the temperature of film, fiber, or membrane casting or spinning may result in a significant solvent loss to the atmosphere. The practitioner may influence the membrane morphology and properties by control of the rate of solvent evaporation. Useful methods of controlling the rate of solvent loss from a nascent membrane include addition to an organic non-solvent having a boiling point higher than the solvent for PEEK or a PEEK oligomer in the casting solution as a means to reduce the vapor pressure of the high boiling point organic solvent and thereby minimize solvent loss during formation of the hollow fiber PEEK membrane. Other steps useful to control loss from the PEEK solution after it is formed into the configuration of the membrane include shielding the membrane from convective air flow, or immersion of the configured film, fiber or membrane into a coagulation fluid having a low affinity for the high boiling point organic solvent for PEEK until coagulation is substantially complete. A further measure convenient in the preparation of hollow fiber membranes of PEEK to limit solvent loss is to minimize the air gap between the extruder and the coagulation bath and, correspondingly, the time of exposure of formed PEEK solution. The practical methods of controlling PEEK solvent evaporation described for hollow fiber membranes are useful also for solid fibers and flat sheet PEEK membrane formation.

The foregoing invention is illustrated by the following examples. All percentages are by weight unless otherwise specifically stated.

EXAMPLE 1

In each of a series of runs, 0.5 gram (g) portions of PEEK, available at Imperical Chemical Industries, Wilmington, Del., and sold under the registered trademark VICTREX® 380 P powder, is mixed with 4 to 7 cc of a high temperature solvent in a glass bottle. For those solvents listed which are solid at room temperature, 0.5 g PEEK is mixed with 2 g to 6 g of the solvent. The glass bottle is heated on a Sybron ™ Nuova-II hot plate set to maintain a surface temperature as determined by a thermocouple of about 300° C. for approximately 30 minutes to dissolve PEEK. Upon dissolution, the resulting solution is a homogeneous clear liquid, beige or brownish-yellow in color. Upon being permitted to cool to room temperature, the solution solidifies without an apparent or visible phase separation. Solvents employed in the preparation of PEEK solutions in Example 1 include:

| Compound | Boiling Point °C. |
| --- | --- |
| Benzophenone | 305 |
| α-chloronaphthalene | 259 |
| Diphenylsulfone | 379 |
| 2-Phenylphenol | 282 |
| p-Methoxynaphthalene | 274 |
| Ethyl-4-hydroxybenzoate | 297 |
| n-Cyclohexyl-2-pyrrolidone | 305 |
| Pentafluorophenol | 178 |
| Dimethylphthalate | 284 |
| Phenylbenzoate | 298 |

EXAMPLE 2(a)

A sample of PEEK (VICTREX® 380 P) and benzophenone are mixed together in a 30 m glass bottle at a weight-to-weight ratio of 1:6 PEEK to benzophenone. The bottle is heated on a hot plate having a surface temperature of about 300° C. about 30 minutes until a homogeneous liquid solution forms The prepared solution is cast on a glass slide 5 cm×7.5 cm, pre-warmed on a hot plate to a temperature of 100° to 150° C. The nascent PEEK membrane film is then rapidly cooled by an air blower to room temperature.

After cooling, the membrane sample is peeled from the glass slide with a razor blade and immersed in methanol for 1 hour to leach out the benzophenone. The sample appears white in color and opaque to light transmission in methanol. The sample is then rinsed in water and air dried for 3 hours.

Examination of a sample of the membrane under a scanning electron microscope reveals a high degree of asymmetry and the presence of a skin on the surface exposed to air while cooling. Pores with a diameter of 0.1 to 0.3 $\mu$m are visible on the skin. The membrane surface in contact with the glass slide during cooling shows pores of a size from 1 to 4 $\mu$m.

Figure 1A:
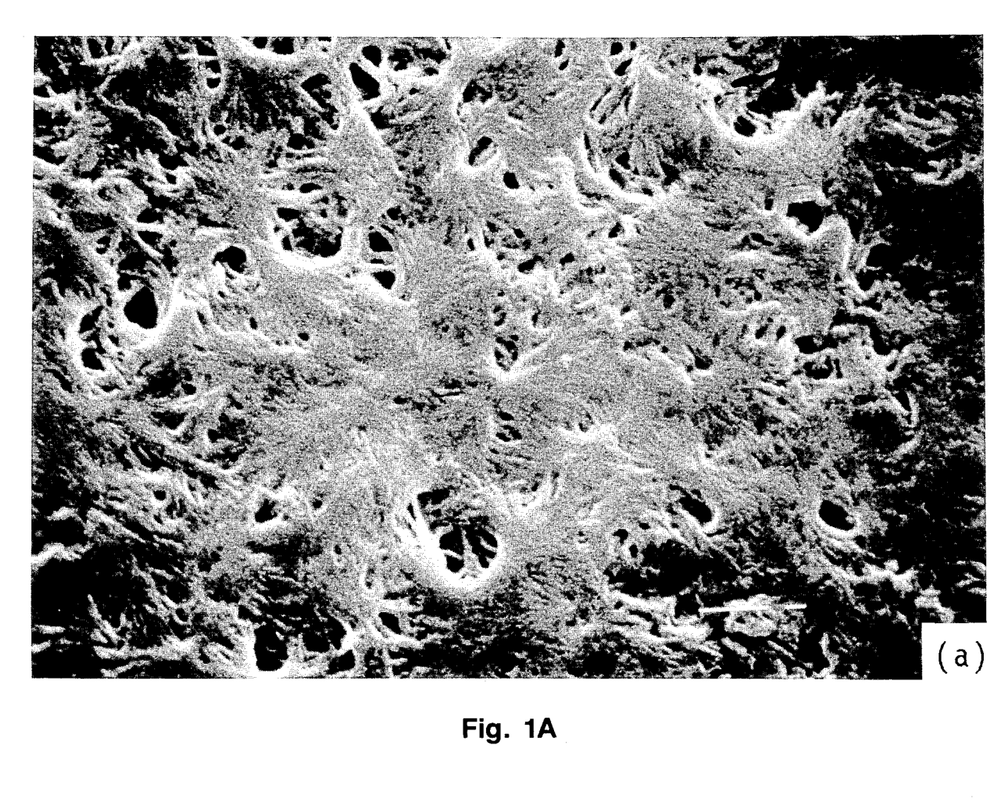
FIG. 1A is a scanning electron microscope photograph of the surface exposed to air of a PEEK membrane cast from a quickly cooled solution of benzophenone solvent.

FIG. 1A is a scanning electron microscope photograph of the surface exposed to air of a PEEK membrane prepared according to Example 2(a) which shows pores formed on the skin.

Figure 1B:
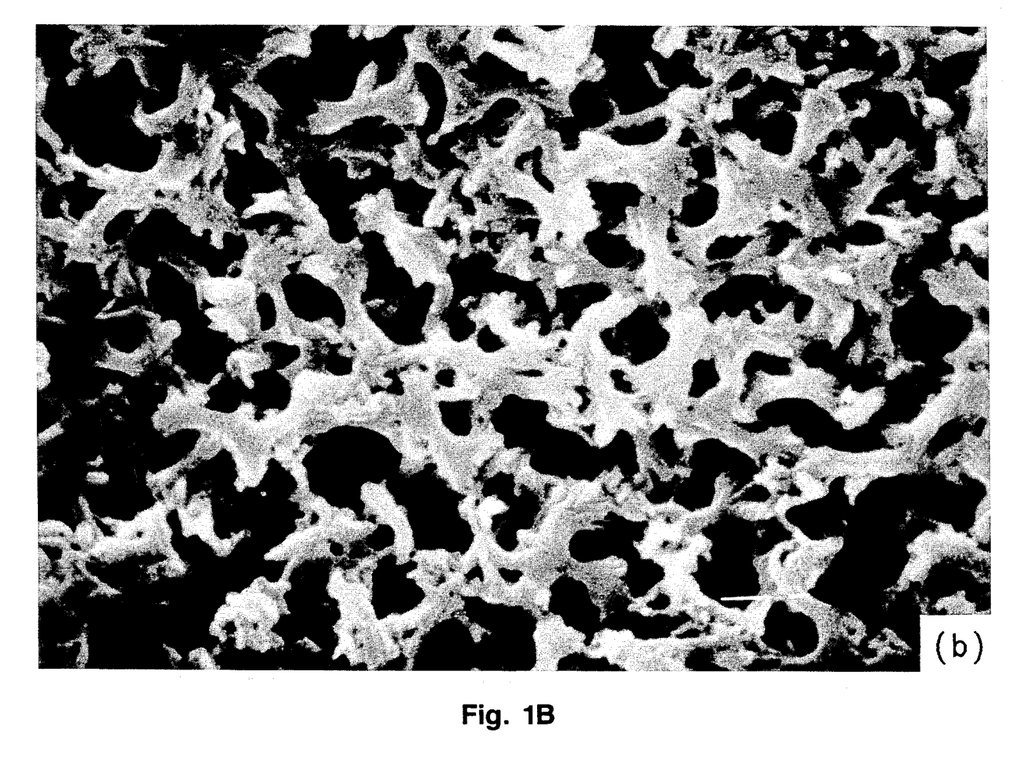
FIG. 1B is a scanning electron microscope photograph of the surface in contact with a glass plate during formation of a PEEK membrane cast from a quickly cooled solution of benzophenone solvent.

FIG. 1B is a scanning electron microscope photograph of the surface in contact with the glass plate of a PEEK membrane prepared according to Example 2(a).

EXAMPLE 2(b)

A sample of the membrane formed as in Example 2(a) having a thickness of 90 $\mu$m (3.6 mil) is fixed in an Amicon Model 8010 filtration cell of a size of 10 ml. At a pressure of 138 kP (20 psig), the flux rate for water is 0.12 ml/cm$^2$-min-atm.

EXAMPLE 2(c)

A membrane prepared as in Example 2(a) is placed in the test cell. At a pressure of 138 kP, an aqueous solution of a polystyrene latex solution of 15 percent by weight latex of a particle size 0.091 $\mu$m is retained by the membrane.

EXAMPLE 3(a)

A sample of PEEK dissolved in benzophenone is cast on a glass slide as in Example 2(a), except that after casting the solution, the slide and nascent PEEK membrane are cooled slowly. The hot plate is turned off as the PEEK solution is cast on the glass slide. The hot plate is shielded to limit air convection and thereby limit the rate of solvent evaporation. The hot plate and slide are cooled from 100° to 150° C. to room temperature by ambient air. Examination of a sample of the membrane thus formed under a scanning electron microscope reveals asymmetry but to a lesser degree than is observed in the rapidly cooled samples for Example 2(a). A porous network formation is seen on the surface exposed to air. Pores visible in the skin have a diameter of about 1 $\mu$m.

Figure 2A:
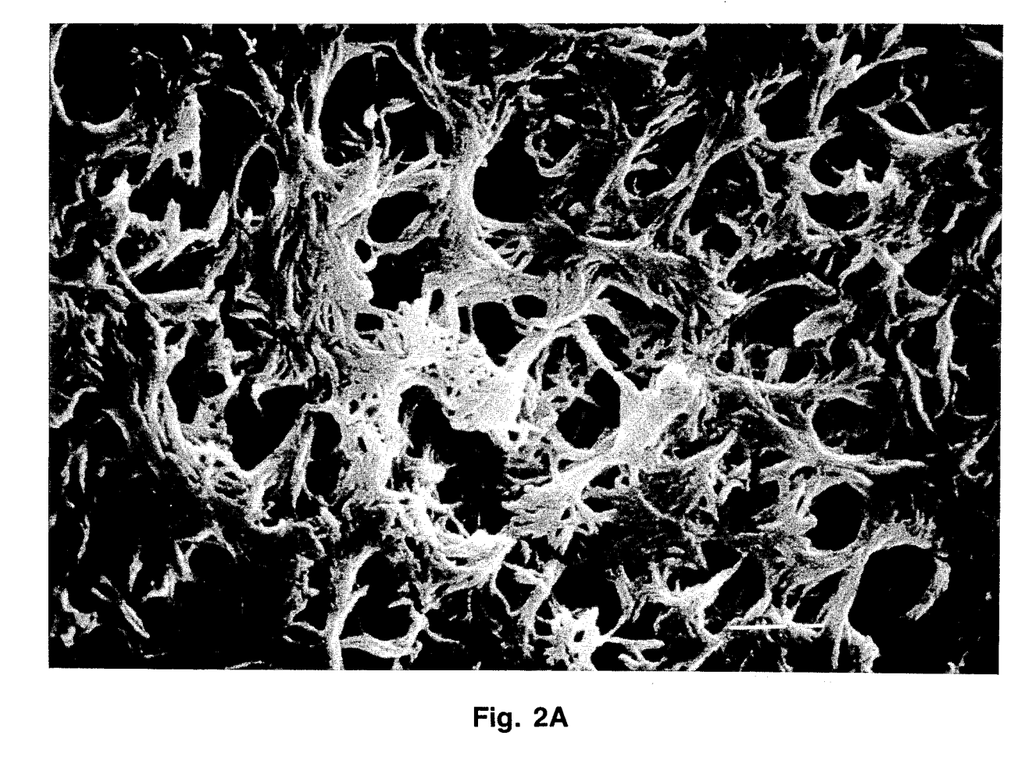
FIG. 2A is a scanning electron microscope photograph of the surface exposed to air of a PEEK membrane cast from a slowly cooled solution of benzophenone solvent.

FIG. 2A is a scanning electron microscope photograph of the surface exposed to air of a PEEK membrane prepared according to Example 3(a).

The examination of the surface of the membrane in contact with the glass shows pores having a diameter of 1 $\mu$m to 4 $\mu$m.

Figure 2B:
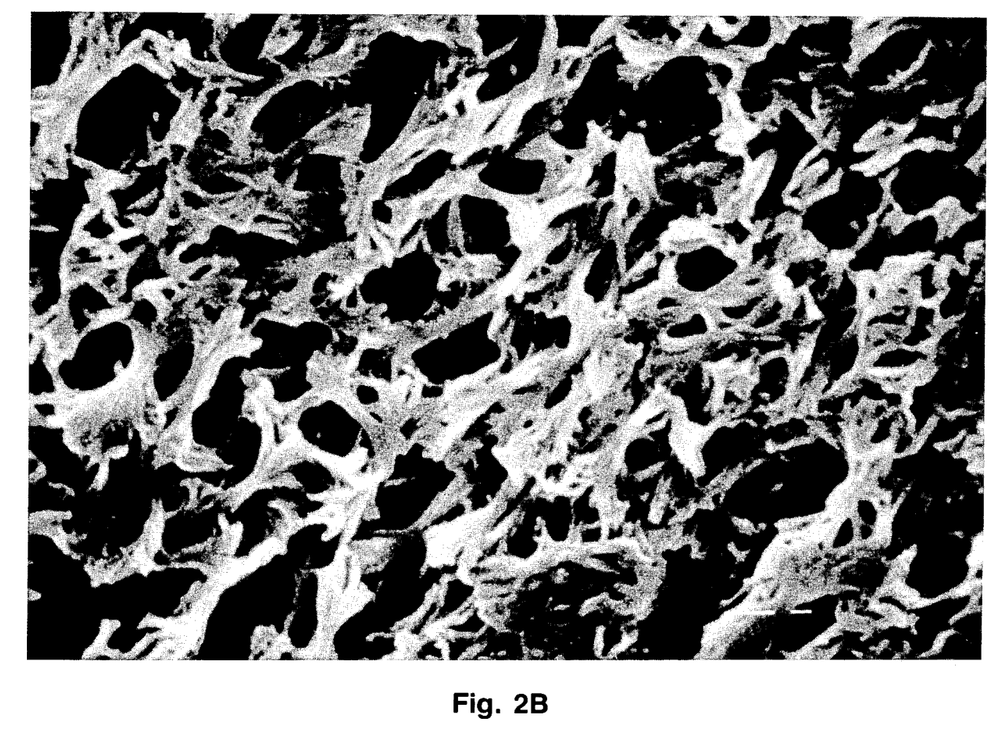
FIG. 2B is a scanning electron microscope photograph of the surface in contact with a glass plate during formation of a PEEK membrane cast from a slowly cooled solution of benzophenone solvent.

FIG. 2B is a scanning electron microscope photograph of the surface in contact with the glass of a PEEK membrane prepared according to Example 3(a).

EXAMPLE 3(b)

A sample of membrane formed as in Example 3(a) having a thickness of 100 $\mu$m (4 mil) is placed in the test cell. At a pressure of 138 kP the flux rate for water is 0.04 ml/cm$^2$-min-atm.

EXAMPLE 3(c)

A membrane as in Example 3(a) is placed in the test cell. At a pressure of 138 kP the membrane retains an aqueous solution of 15 percent by weight polystyrene latex of a particle size 0.173 $\mu$m.

Table 1 illustrates the influence of cooling conditions on membrane properties.

| Example No. | Preparation Condition | Membrane Thickness $\mu$m | Flow Rate ml/cm$^2$-min-atm | Retention Size $\mu$m |
| --- | --- | --- | --- | --- |
| 3 | Slow cool | 100 | 0.04 | 0.173 |
| 2 | rapid cool | 90 | 0.12 | 0.091 |

The transport characteristics of the membranes demonstrate that the more symmetric pore structure formed in the slow cool sample results in a slower rate of water transmission, in spite of a larger pore size. The flow rate for slowly cooled membranes is speculated to result from clogging or internal fouling as a result of the more symmetric structure than appears in the rapid cool Example 2.

EXAMPLE 4

A membrane is formed from a solution of 0.5 gram of PEEK, VICTREX® 380 P, and 8 ml of α-chloronaphthalene according to the method of Example 2(a), except the bottle is heated on a hot plate to dissolve PEEK to a resulting homogeneous liquid solution. The liquid PEEK solution is cast on a room temperature glass slide. The PEEK is allowed to air cool to room temperature. The glass slide with the nascent membrane attached is immersed in acetone for 1 hour to leach out the α-chloronaphthalene. The membrane appears white and opaque. After acetone leaching, the membrane is dried in a vacuum oven for 3 hours and peeled off the glass slide with tweezers. A uniform symmetric microporous structure is observed under the scanning electron microscope. The surface pore size is from 0.1 to 0.3 $\mu$m.

Figure 3:
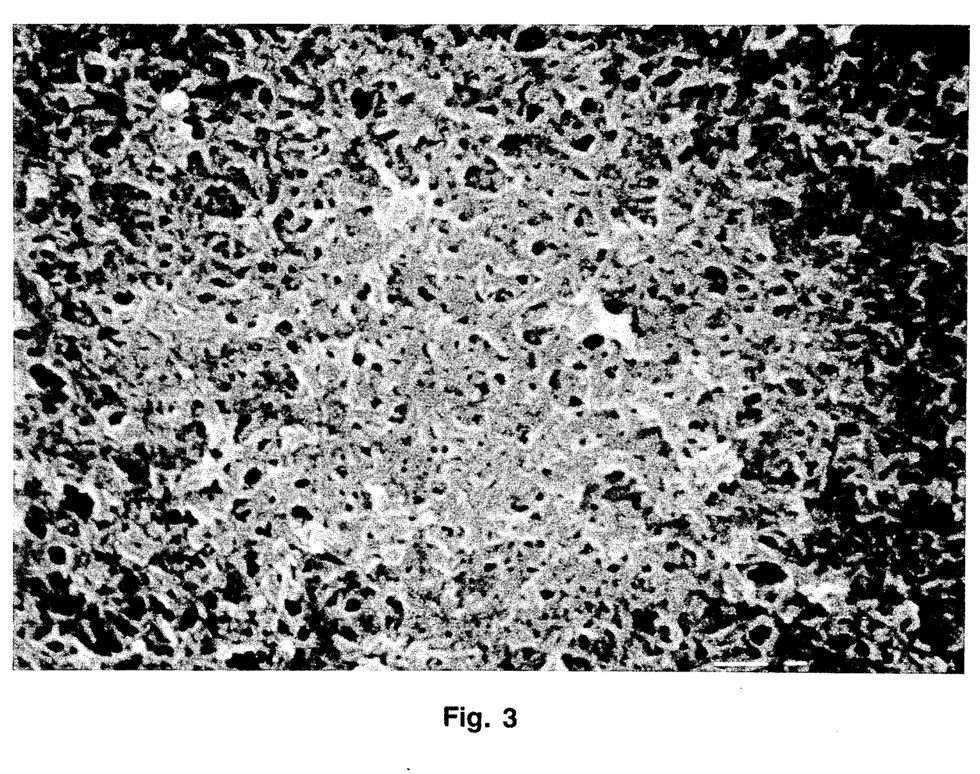
FIG. 3 is a scanning electron microscope photograph of the surface exposed to air of a PEEK membrane cast from a solvent of α-chloronaphthalene.

FIG. 3 is a scanning electron microscope photograph of the surface exposed to air of a PEEK membrane prepared according to Example 4.

EXAMPLE 5(a)

A membrane is formed from a solution of 0.4 gram of PEEK, VICTREX® 380 P, and 4 g 2-phenylphenol powder according to Example 4. A number of membranes are prepared in the manner of Example 3. A uniform symmetric microporous structure is observed under the scanning electron microscope. The surface pore size is about 3 $\mu$m.

EXAMPLE 5(b)

A sample of membrane formed as in Example 5(a) having a thickness of 76 $\mu$m (0.003 in) is placed in the test cell. At a pressure of 138 kP, the flux rate for water is 6.5 ml/cm$^2$-min-atm. Water transmission and retention properties of a 76 $\mu$m (0.003 in) thick membrane tested according to the method of Example 2 shows a size retention of 0.173 $\mu$m and a water transmission rate of 6.5 ml/cm$^2$-min-atm.

EXAMPLE 5(b)

A membrane as in Example 5(a) is placed in the test cell. At a pressure of 138 kP the membrane retains an aqueous solution of 15 percent by weight polystyrene latex of a particle size 0.173 $\mu$m. The membrane passes an aqueous solution of 15 percent by weight polystyrene latex of a particle size 0.091 $\mu$m.

EXAMPLE 6(a)

A solution of 21 grams of PEEK, VICTREX® 450 P powder, 33 g of diphenylsulfone and 6 g of POLYGLYCOL® E1000 (trademark of The Dow Chemical Company), a polyethylene glycol having an average molecular weight of about 1,000, is prepared as in Example 4, except the mixture is heated to 375° C. in a PYREX® beaker covered with a metal foil to minimize solvent loss. The mixture is then stirred with a stirring rod for 10 minutes. The beaker is thereafter quenched in an ice water slurry to solidify the blend of polymer and solvent. The polymer/solvent blend is removed from the beaker and dried in a vacuum. The resultant solid is crushed and ground into granules for fiber spinning.

Hollow fibers are spun from the granules using a conventional ram extrusion process. The extruder consists of a barrel and a single tow hollow fiber spinnerette. Both the barrel and the spinnerette are preheated to about 285° to 290° C. 25 Grams of PEEK granules are fed into the barrel, heated for 5 minutes and rammed by the plunger through the spinnerette to provide an extrusion factor (nominal extrudate velocity at the die face, divided by the velocity of the plunger in the barrel) of 120. Nitrogen is injected as a core gas into the hollow PEEK fiber at a flow rate in a range of 20 to 200 cc/minute. The molten PEEK fiber is immersed within 0.63 cm after emerging from the spinnerette into a container of N-methylpyrrolidinone (NMP) maintained at a temperature of about 0° C. to 5° C. The collected fiber is subsequently transferred to an acetone bath for further leaching and rinsing, subsequently washed in water and air dried. The resulting fiber has an outside diameter of 700 $\mu$m and an inside diameter of 420 $\mu$m.

Scanning electron microscope examination shows the presence of pores on the outer skin having a size of 5 to 10 $\mu$m. Scanning electron microscope examination shows the presence of pores on the lumen surface having a size of from 0.2 $\mu$m to 1 $\mu$m.

EXAMPLE 6(b)

A sample of hollow fiber microporous membrane formed according to Example 6(a) is tested for water flux. A flow rate of from 0.8 to 2.1 l/m$^2$-day (2.5 to 6.1 gfd) under pressure of about 345 kP (50 psig).

EXAMPLE 6(c)

A sample of membrane formed as in Example 6(a) retains a 0.3 percent aqueous solution of polystyrene latex having a particle size of 0.091 $\mu$m under pressure of about 345 kP (50 psig).

A membrane prepared according to Example 6(a) thus demonstrates suitability for microfiltration applications.

EXAMPLE 7

A hollow fiber is formed from a homogeneous solution of 21 grams of PEEK, Victrex® 450 P powder and 39 g of diphenylsulfone according to Example 6(a), except that tetraethylene glycol replaces NMP as the coagulation liquid.

The membrane fiber wall is asymmetric and has a wall thickness of 140 $\mu$m and a lumen diameter of 420 $\mu$m. About 60 percent of the weight of the quenched nascent hollow fiber is lost through the acetone leaching step. Scanning electron microscope examination shows pores on the lumen surface having a size of from 0.5 to 2 $\mu$m. SEM examination shows the fiber walls to be asymmetric with a skin layer of about 0.8 $\mu$m thick and a microporous sublayer.

The foregoing detailed description and examples are given to aid in the understanding of the invention. No unnecessary limitations are to be understood from the specification or the examples. The invention is not limited to the exact details stated because obvious modifications will occur to those skilled in the art.

What is claimed is:

1. A method of manufacture of a film of poly(oxy-1,4-phenyleneoxy-1,4-phenylene-carbonyl-1,4-phenylene)

(PEEK) comprising dissolving solid PEEK in an organic polar solvent having a boiling point in a range from 141° C. to 380° C., then casting the PEEK solution on a smooth surface.

2. A method as in claim 1 wherein the organic polar solvent is selected from the group consisting of diphenylsulfone, 2-phenylphenol, p-methoxyphenol, 2-methoxynaphthalene, ethyl-4-hydroxybenzoate, N-cyclohexyl-2-pyrrolidone, pentafluorophenol, dimethylphthalate, and phenyl benzoate.

3. A method of forming a film of PEEK as in claim 1 wherein PEEK is present in the casting solution in a concentration of from 5 percent to 95 percent by weight.

4. A method as in claim 1 wherein a support is incorporated into said film.

5. A method as in claim 4 wherein said fibrous support is selected from the group consisting of non-woven polyester fibers or glass fibers.

6. A method as in claim 1 wherein the nascent membrane is contacted with a coagulation fluid which is miscible with the solvent for PEEK but which is not a solvent for PEEK.

7. A method as in claim 6 wherein the organic solvent is selected from the group consisting of diphenylsulfone, 2-phenylphenol, p-methoxyphenol, 2-methoxynaphthalene, ethyl-4-hydroxybenzoate, N-cyclohexyl-2-pyrrolidone, pentafluorophenol, dimethylphthalate, and phenyl benzoate.

8. A method of forming a microporous membrane of PEEK comprising dissolving solid PEEK in an organic polar solvent having a boiling point in a range from 141° C. to 380° C., casting the PEEK solution on a smooth surface and removing the organic polar solvent from the microporous PEEK membrane.

9. A method of forming a microporous membrane as in claim 8 wherein the organic polar solvent is selected from the group consisting of benzophenone, α-chloronaphthalene, diphenylsulfone, 2-phenylphenol, p-methoxyphenol, 2-methoxynaphthalene, ethyl-4-hydroxybenzoate, N-cyclohexyl-2-pyrrolidone, pentafluorophenol, dimethylphthalate, and phenyl benzoate.

10. A method of forming a microporous membrane as in claim 8 wherein the PEEK is present in the casting solution in a concentration of from 5 percent to 95 percent by weight.

11. A method of forming a microporous membrane as in claim 8 wherein a fibrous support is incorporated into the membrane.

12. A method of forming a microporous membrane as in claim 8 wherein, after the step of casting the PEEK solution on a smooth surface, is added the step of contacting the nascent membrane with a coagulation liquid before step of removing the organic polar solvent from the microporous PEEK membrane.

13. A method of forming a microporous membrane as in claim 12 wherein the coagulation liquid has a low affinity for the organic polar solvent.

14. A method of forming a microporous membrane as in claim 12 wherein the coagulation liquid has a high affinity for the organic polar solvent.

15. A method of forming a fiber of PEEK comprising dissolving solid PEEK in an organic polar solvent having a boiling point in a range from 175° C. to 310° C., extruding the solution of dissolved PEEK and coagulating the PEEK.

16. A method of forming a fiber of PEEK as in claim 15 wherein the fiber is extruded into a coagulation liquid bath.

17. A method of forming a fiber of PEEK as in claim 16 wherein the coagulation bath has a low affinity for the solvent for PEEK.

18. A method of forming a fiber of PEEK as in claim 16 wherein the coagulation bath has a high affinity for the solvent for PEEK.

19. A method of forming a fiber of PEEK as in claim 16 wherein the solution contains dissolved PEEK in a concentration from 5 percent to 95 percent.

* * * * *